United States Patent [19]
Mirebeau et al.

[11] Patent Number: 5,502,279
[45] Date of Patent: Mar. 26, 1996

[54] JOINT FOR ELECTRICAL CABLES

[75] Inventors: Pierre Mirebeau, Villebon Sur Yvette; Stanislas Galaj, Arcueil; Madeleine Prigent, Marcoussis, all of France

[73] Assignee: Euromold, Brussels, Belgium

[21] Appl. No.: 362,663

[22] Filed: Dec. 22, 1994

[30] Foreign Application Priority Data

Dec. 23, 1993 [FR] France .................... 93 15557

[51] Int. Cl.$^6$ .................................. H02G 15/103
[52] U.S. Cl. ........................ 174/73.1; 174/84 R
[58] Field of Search ................ 174/73.1, 84 R, 174/88 R, 88 C

[56] References Cited

U.S. PATENT DOCUMENTS

| | | | |
|---|---|---|---|
| 4,006,288 | 2/1977 | Stevens | 174/73.1 |
| 4,056,680 | 11/1977 | Aihara et al. | 174/73.1 |
| 4,079,189 | 3/1978 | Troccoli | 174/73.1 |
| 4,192,964 | 3/1980 | Sacks | 174/73.1 |
| 4,390,748 | 6/1983 | Bottcher et al. | 174/73.1 |
| 4,822,952 | 4/1989 | Katz et al. | 174/73.1 |
| 5,294,752 | 3/1994 | Vallauri et al. | 174/73.1 |
| 5,365,020 | 11/1994 | Vallauri et al. | 174/73.1 |

FOREIGN PATENT DOCUMENTS

| | | |
|---|---|---|
| 0507676A2 | 10/1992 | European Pat. Off. . |
| 0539905A1 | 5/1993 | European Pat. Off. . |
| 0549942A3 | 7/1993 | European Pat. Off. . |
| 2111769 | 7/1983 | United Kingdom . |

Primary Examiner—Morris H. Nimmo
Attorney, Agent, or Firm—Sughrue, Mion, Zinn, Macpeak & Seas

[57] ABSTRACT

The present invention concerns a joint for electrical cables comprising at least a first layer constituted by a mixture of a polymeric matrix and a filler which is constituted by polymer comprising functions in its monomer units which homogeneously distribute the electrical filed, surrounded externally and coaxially by a second layer constituted by an elastomer. The layers are intimately associated with each other with an adherence greater than or equal to 5 N.cm$^{-1}$.

8 Claims, 4 Drawing Sheets

JOINT FOR ELECTRICAL CABLES

The present invention concerns a joint for joining medium or high tension electrical cables (operating at 1.8/3 (3.6 kV) or more), preferably, but not exclusively, for the transport of alternating current.

Currently, two cables are joined together using a prefabricated injection molded or extruded joint which constitutes an insulation system around the joined cable cores. The joint comprises an electrically insulative layer placed between two conductive layers which distribute the electric field evenly. The two layers enclosing the insulative layer are generally composed of a material which is based on a polymeric semiconductor with a conductive carbon black filler, usually EPDM (ethylene-propylene-diene terpolymer with a methylene main chain). United Kingdom application GB-A-2 111 769 describes examples of such joints.

Close to interfaces between the layers, the electric field strength can be several times the nominal field strength, and the breakdown voltage can rapidly be reached, leading to perforation of the insulative layer.

Such a joint has inadequate dielectric properties for this application, leading firstly to breakdown of the joint which can produce disturbances in the distribution of electricity by the grid, and secondly to reduced reliability in manufacture and to high wastage.

An object of the present invention is to provide a joint for medium or high tension electrical cables which has improved dielectric properties with respect to known joints.

Another object of the invention is to provide a joint for medium or high tension electrical cables with increased reliability both of manufacture and of use.

The invention provides a joint for medium or high tension electrical cables comprising at least a first layer which is coaxially and externally surrounded by a second layer which is elastomeric and electrically insulative. The first layer is constituted by a mixture of a polymeric matrix and a filler constituted by a polymer comprising functions in its monomer units suitable for distributing the electric field homogeneously. The filler is selected from polymers containing polar pendant groups with a relative dielectric constant $\epsilon_r$ greater than or equal to 10, the proportions being selected so that the dielectric constant $\epsilon_r$ of said mixture is greater than or equal to 6. The second layer is constituted by a thermoplastic elastomer. The first and second layers are intimately associated with an adhesion greater than or equal to 5 N. cm$^{-1}$.

The electric field is reinforced primarily at the interface between the two layers. The presence of heterogeneities at this interface can cause space charge to accumulate thereby reinforcing the electric field considerably at a local level which can lead to breakdown of the joint. It is thus imperative for the interface between the first and second layers to be as regular as possible and for there to be a high level of adhesion between them.

The filler is a polymer which is preferably selected from nitrile rubber, which is a copolymer of butadiene and acrylonitrile, hydrogenated nitrile rubber (HNBR), chlorinated polyethylene, chlorosulfonated polyethylene, and mixtures containing more than 25% by weight of these polymers.

Polyurethanes or polychloroprene (PCP) can also be used, but their use is rendered difficult due to their toxicity. Polyvinylidene fluoride (PVDF) can also be used, but it is difficult to achieve good adherence.

The pendant polar groups, which orientate themselves depending on the direction of the electric field, contribute to the improved distribution within the bulk of the first layer.

The matrix is selected from an ethylene copolymer, very low density linear polyethylene (VLDPE), and mixtures thereof.

When the matrix is constituted by an ethylene copolymer, it is preferably amorphous and selected from ethylene-propylene-diene terpolymer with a methylene main chain (EPDM), ethylene-propylene copolymer with a methylene main chain (EPM), ethylene-vinyl acetate copolymer (EVA) containing at least 26% of vinyl acetate, ethylene-butylacrylate copolymer (EBA), ethylene-methyl acrylate copolymer (EMA), and mixtures thereof.

The matrix confers its mechanical properties on the mixture and contributes to the adhesion between the first and second layers.

The second layer is preferably constituted by a polyphase thermoplastic elastomer constituted by a mixture of olefin-based polymers produced by dynamic cross-linking in an apparatus containing a screw.

In a first embodiment, the second layer is constituted by a polyphase thermoplastic elastomer selected from mixtures of ethylene-propylene-diene terpolymer with a methylene main chain (EPDM) with poly(ethylene terephthalate) (PET), polyamide (PA), polycarbonate (PC) and polypropylene (PP).

In a second embodiment, the second layer is constituted by a polyphase thermoplastic elastomer selected from mixtures of very low density linear polyethylene (VLDPE) with poly(ethylene terephthalate), polyamide (PA), polycarbonate (PC) and polypropylene (PP).

Thermoplastic elastomers are known to be easy to form, improving productivity. They generally contain an organic phase dispersed in a continuous organic phase. This polyphase structure results in a high interfacial electrical mobility which prevents the appearance of space charge and thus limits any possible amplification of the electric field at the interface.

A thermoplastic elastomer layer for insulating a high tension cable (more than 60 kV) for direct current, placed between the cable core and a metal shield, is described in European patent application EP-A-0 539 905.

In a further preferred embodiment, the second layer is constituted by a cross-linked elastomer selected from ethylene-propylene-diene terpolymer with a methylene main chain (EPDM), ethylene-propylene copolymer with a methylene main chain (EPM or EPR), and very low density linear polyethylene (VLDPE), and alloys and mixtures thereof.

Other features and advantages of the present invention will become clear from the following examples which are given by way of non limiting example. In the accompanying drawings.

Figure 1:
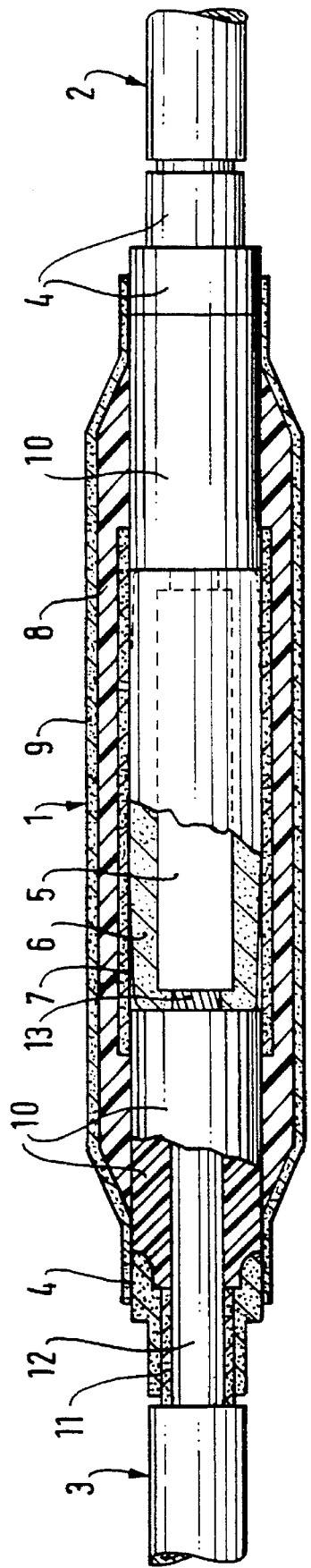
FIG. 1 shows a joint of the invention, formed by injection molding.

FIG. 1 shows a joint 1 of the invention, formed by injection molding, which joins together a first cable 2 and a second cable 3. Cable 3 has an external diameter which is less than that of the extremity of joint 1 and is provided with an adapter 10 provided with a deflector 4. The conductive cores 13 of cables 2 and 3 are connected by a connector piece 5 which is surrounded by a heat dissipator 6. Joint 1 of the invention is composed of a first layer 7 of about 0.6 mm thickness, constituted by a mixture of a polymeric matrix and a filler constituted by a polymer comprising functions in its monomer units which can distribute the electric field homogeneously, to which there adheres a second layer 8 of about 5.5 mm thickness, constituted by a polyphase thermoplastic elastomer, and by an outer semiconductive layer 9 of about 0.6 mm thickness, constituted, in accordance with the prior art, by an EPDM-based material containing a conductive carbon black filler. Each of these layers is connected to the corresponding layer of the cables. When joining cable ends, the cable is cut back to expose the earthed semiconductive layer 11 which shields the cable, connected to outer layer 9 of the joint 1 via deflector 4. An electrically insulative layer 12 is connected to second layer 8 via adaptor 10. Finally, a semiconductive layer 12 covers core 13 of the cable to form an equipotential sleeve which is connected to first layer 7 via heat dissipator 6.

Figure 2:
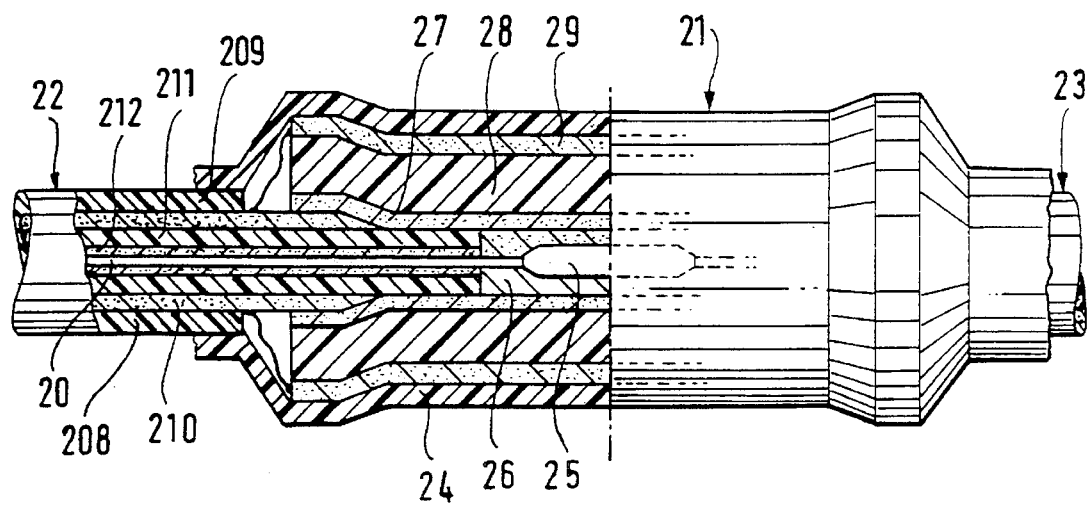
FIG. 2 shows a joint of the invention, formed by extrusion.

FIG. 2 shows a joint 21 in accordance with the invention, formed by extrusion, which can be used to join together a first cable 22 and a second cable 23. The exposed conductive cores 20 of cables 22 and 23 are connected by connector 25 which is surrounded by semiconductive heat dissipator 26 constituted by the same material as the first layer 27. Joint 21 of the invention is composed of a first layer 27 constituted by a polymeric matrix filled with a polymer comprising functions in its monomer units which can homogeneously distribute the electric field, to which there adheres a second layer 28 constituted by a thermoplastic polyphase layer and by an outer semiconductive layer 29 constituted in accordance with the prior art. Each of these layers is connected to the corresponding layer in the cables. When forming a joint, the cable is cut back to expose earthed semiconductive layer 210 for shielding the cable, and which is connected to outer layer 29 of joint 21. An electrical insulative layer 211 is connected to second layer 28. Finally, a semiconductive layer 212 covers core 20 of the cable to form an equipotential sleeve which is connected to first layer 27 via heat dissipator 26. A protective sheath 24 covers the joint and extends the protective sheath 208 of the cable.

EXAMPLE 1

A prior art joint A was formed which comprised a first semiconductive layer of 0.6 mm thickness composed of a mixture of an EPDM matrix ($\epsilon_r$=2.5) to which 60 parts by weight of a "furnace black" type carbon black conductor had been added. This mixture had an electrical resistivity of 80 $\Omega$.cm at 50 Hz, 600% elongation at rupture at room temperature, and an ultimate tensile strength of 10 MPa.

A 5.5 mm thick second insulative layer constituted by EDPM was positioned on this first layer.

The outer semiconductive layer was of identical composition to the first layer.

EXAMPLE 2

A prior art joint B was formed which comprised a first semiconductive layer of 0.6 mm thickness composed of a mixture of an EPDM matrix to which 30 parts by weight of a "KETJEN" type carbon black conductor had been added. This mixture had a relative dielectric constant $\epsilon_r$ of 8 at 50 Hz, 550% elongation at rupture at room temperature, and an ultimate tensile strength of 14 MPa.

A 5.5 mm thick second insulative layer constituted by EDPM was positioned on this first layer.

The outer semiconductive layer was of identical composition to the first layer.

EXAMPLE 3

A joint C was formed in accordance with the invention which comprised a first semiconductive layer of 0.6 mm thickness composed of a homogeneous mixture of 50 parts by weight of an ethylene—45% vinyl acetate EVA copolymer ($\epsilon_r$=2.5) sold by BAYER under the trade name LEVAPRENE 450, 50 parts by weight of hydrogenated nitrile rubber HNBR ($\epsilon_r$=40) sold by BAYER under the trade name TORNAC 3855, 3 parts by weight of a cross-linking agent constituted by dicumyl peroxide sold under the trade name PERKADOX BC 40, and 1.5 parts by weight of an antioxidizing agent constituted by poly-1,2-dihydro- 2,2,4-trimethylchinoline. This mixture had a relative dielectric constant $\epsilon_r$ of 11 at 50 Hz, 450% elongation at rupture at room temperature, and an ultimate tensile-strength of 5 MPa.

A 5.5 mm thick second insulative layer constituted by EDPM was positioned on this first layer. The adhesion between the two layers was 10 daN.cm$^{-1}$.

The outer semiconductive layer was of identical composition to the first layer.

EXAMPLE 4

A joint E in accordance with the invention was formed which comprised a first semiconductive layer of 0.6 mm thickness composed of a homogeneous mixture of 50 parts by weight of an ethylene—45% vinyl acetate EVA copolymer ($\epsilon_r$=2.5) sold by BAYER under the trade name LEVAPRENE 450, 50 parts by weight of hydrogenated nitrile rubber HNBR ($\epsilon_r$=40) sold by BAYER under the trade name TORNAC 3855, 3 parts by weight of a cross-linking agent constituted by dicumyl peroxide sold under the trade name PERKADOX BC 40, and 1.5 parts by weight of an antioxidizing agent constituted by poly-1,2-dihydro- 2,2,4-trimethylchinoleine. This mixture had a relative dielectric constant $\epsilon_r$ of 11 at 50 Hz, 450% elongation at rupture at room temperature, and an ultimate tensile strength of 5 MPa.

A 5.5 mm thick second insulative layer, constituted by a mixture of polymers containing 70% by weight of EDPM and 30% by weight of PC, was positioned on this first layer. The adhesion between the two layers was 10 daN.cm$^{-1}$.

The outer semiconductive layer was of identical composition to the first layer.

EXAMPLE 5

Figure 3:
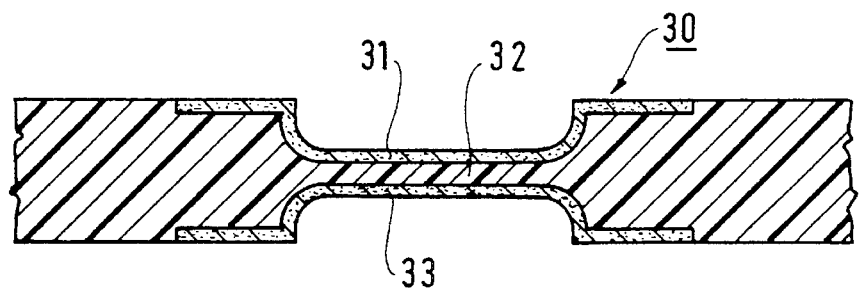
FIG. 3 is a schematic cross section of a sample used for the breakdown resistance test.

A breakdown resistance test was carried out on a 0.7 mm thick sample, with a cross section as shown in FIG. 3. The samples were analogous to joints A, B, C and E formed in accordance with Examples 1 to 4. Sample 30 was formed by placing a first layer 31 on a second layer 32 in accordance with the present invention, with a third outer layer 33 which was composed of a prior art mixture of an EPDM matrix and 60 parts by weight of a "furnace black" type carbon black conductor.

Figure 4:
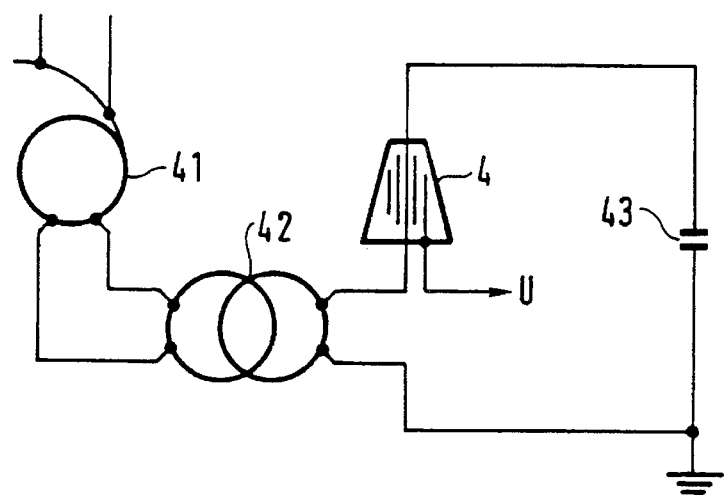
FIG. 4 is a circuit diagram of the apparatus used for the breakdown resistance test.

The test was carried out using an apparatus as shown in FIG. 4, which subjected the samples to an alternating voltage gradient of 50 Hz, generated by voltage divider 41, and applied to the input of a step up transformer 42. The corresponding high voltage U was directly applied to a sample holder 43 and measured at the terminals of capacitor 44. The sample holder was constituted by two brass electrodes and immersed in a silicone oil bath to produce sufficient insulation and to study temperature effects.

The voltage across the samples was increased at 1 kV/sec with alternating current. The results were treated using the Weibull statistical method which gave the breakdown probability (%) of samples A to F for a field of 30 kV/mm. These values are shown in Table I below:

TABLE I

| Reference | A | B | C | E |
|---|---|---|---|---|
| Breakdown Probability (%) | 5 | 5 | 3 | 1 |

It can be seen that lower probabilities are obtained for sample E in accordance with the present invention. This test shows the advantage of joints C and E in accordance with the invention concerning breakdown behavior under the effects of a short duration disturbance.

EXAMPLE 6

A joint B' was formed in accordance with the prior art which was analogous to joint B described in Example 2, with the exception of the outer layer which had a composition identical to that of the first layer of joint B.

EXAMPLE 7

A joint C' was formed in accordance with the prior art which was analogous to joint C described in Example 3, with the exception of the outer layer which had a composition identical to that of the first layer of joint C.

EXAMPLE 8

A joint E' was formed in accordance with the prior art which was analogous to joint E described in Example 5, with the exception of the outer layer which had a composition identical to that of the first layer of joint E.

EXAMPLE 9

Figure 5:
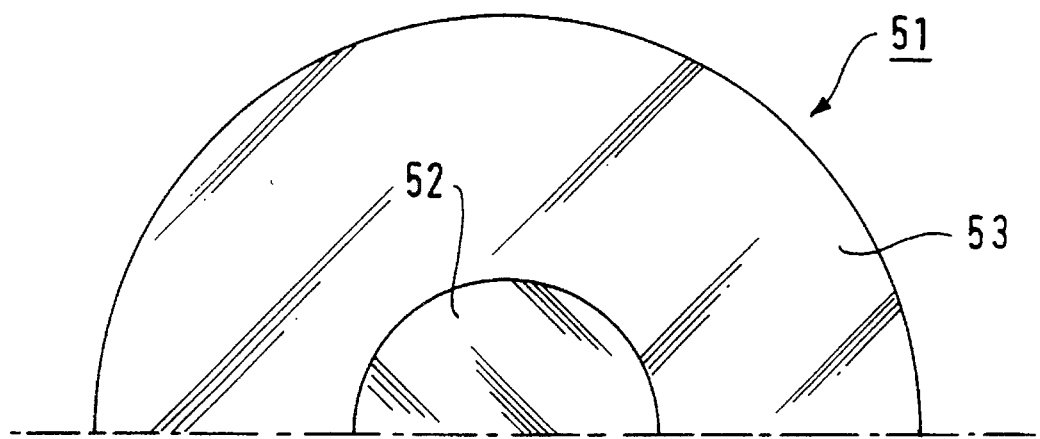
FIG. 5 shows a schematic top view of a sample used for the electric field reinforcement test.
Figure 6:
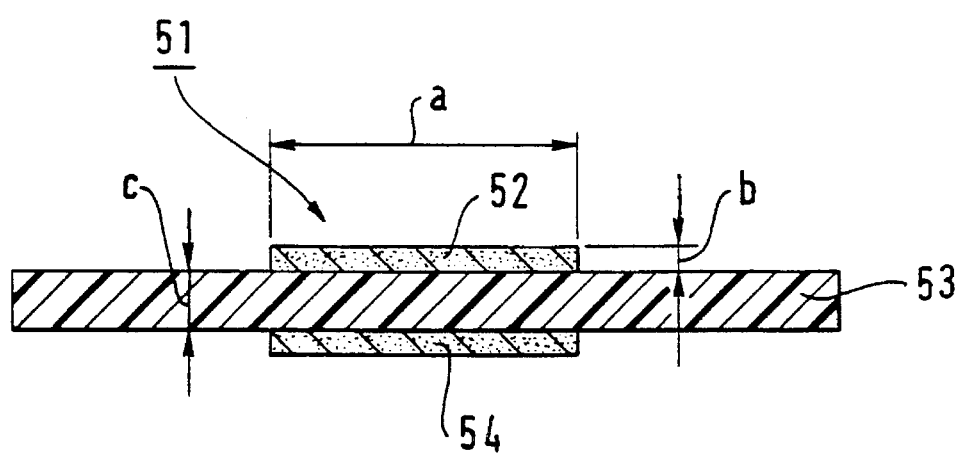
FIG. 6 is a schematic section of the sample of FIG. 5.

An electric field reinforcement test was carried out on 2 mm thick samples shown in top view in FIG. 5 and in cross section in FIG. 6. The samples were analogous to joints A, B', C', and E' formed in Examples 1 and 6 to 8. FIG. 6 shows a cross section of a sample 51 of 20 mm diameter formed a first layer 52 of thickness b=0.5 mm, to which there adheres an insulative layer 53 in accordance with the present invention, of thickness c=1 mm, and a third outer layer 54 of thickness 0.5 mm with an identical composition to that of the first layer 52.

Figure 7:
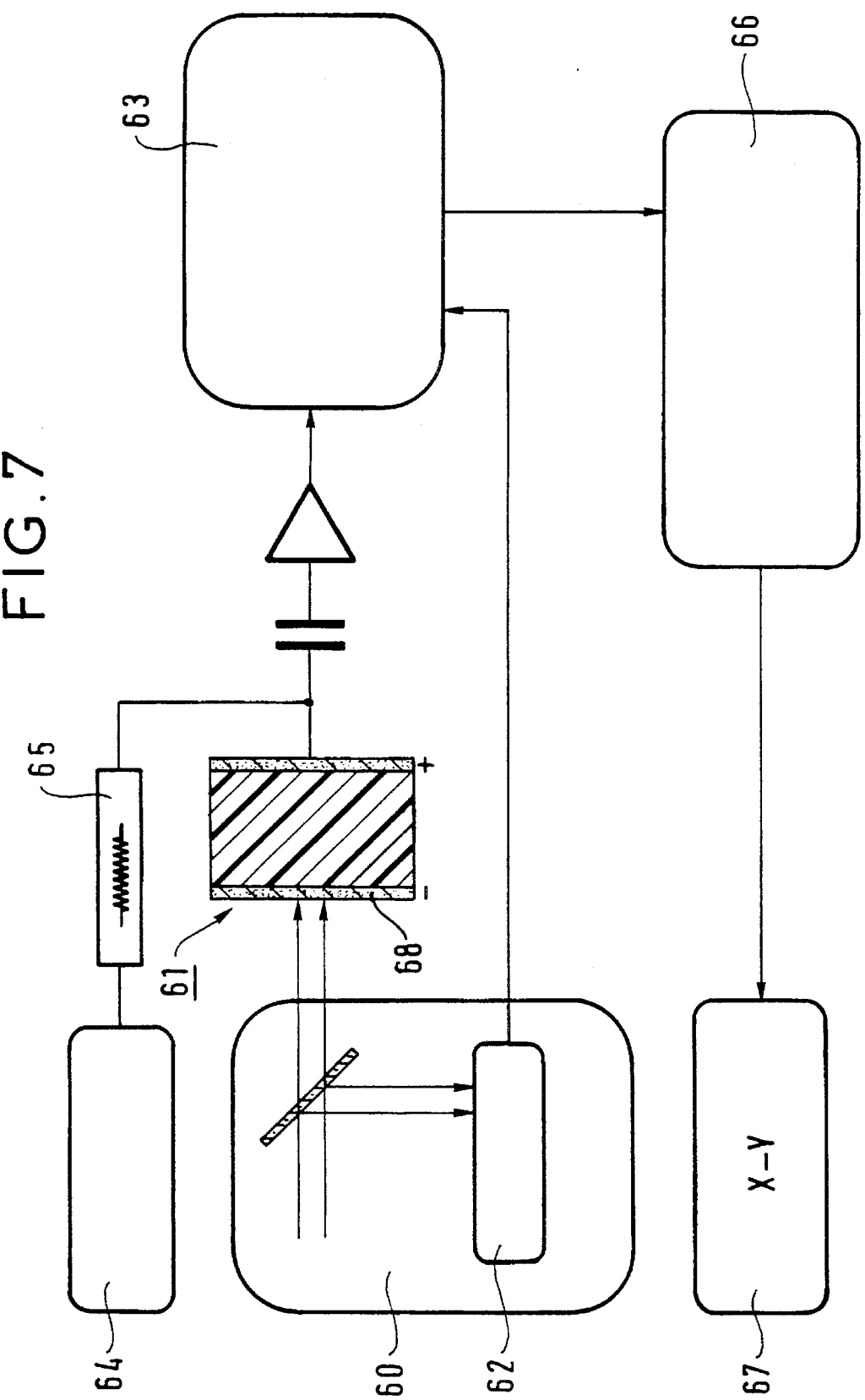
FIG. 7 is a circuit diagram of the apparatus used for the electric field reinforcement test.

The apparatus shown in FIG. 7 is composed of a "YAG" laser whose beam is sent to target 61 which is sample 51, in which the semiconductors form a positive electrode (+) and a negative electrode (−). This beam is absorbed at the surface of the negative electrode 68 (−) and decomposes the surface by pyrolysis. The gases emitted give rise to a pressure wave which passes through the sample. This wave modulates the charge images on the electrodes and allows the charge density in the sample to be calculated.

Photodiode 62 synchronizes recorder 63 with the laser 60. The circuit is supplied electrically from a high voltage supply 64 provided with a resistor 65. The recorded data are transferred to a computer 66 and processed to provide an output as a function of time on a plotter 67.

The samples were polarized to 30 kV/mm in direct current, and the time at which 50% field reinforcement could be observed at the electrodes was measured. Observations were taken at hourly intervals. The times, in hours, are shown in Table II below:

TABLE II

| Reference | A | B' | C' | E' |
|---|---|---|---|---|
| Time (H) | 1 | 1 | 20 | over 48 |

This test shows the advantage of joints C' and E' of the present invention for the performance of the joint during the period of its use.

The present invention is not limited to the embodiments described. The skilled person could envisage a variety of variations without departing from the scope of the invention. In particular, any means could be replaced by an equivalent means without departing from the ambit of the invention.

We claim:

1. A joint for a medium or high tension electrical cable comprising, coaxially from the cable core, at least a first layer which is externally surrounded by a second layer that is elastomeric and electrically insulative, characterized in that said first layer is constituted by a mixture of a polymeric matrix and a filler constituted by a polymer comprising functions in its monomer units which can distribute the electric field homogeneously, said filler being selected from a polymer containing polar pendant groups with a relative dielectric constant greater than or equal to 10, the proportion being selected so that the dielectric constant of said mixture is greater than or equal to 6, said first and second layers being intimately associated with an adhesion greater than or equal to 5 N.cm$^{-1}$.

2. A joint according to claim 1, characterized in that said filler is selected from nitrile rubber, hydrogenated nitrile rubber, chlorinated polyethylene, chlorosulfonated polyethylene, and mixtures containing more than 25% by weight of said polymers.

3. A joint according to claim 1 characterized in that said matrix is selected from an ethylene copolymer and very low density linear polyethylene, and mixtures thereof.

4. A joint according to claim 3, characterized in that said matrix is selected from ethylene-propylene-diene terpolymer with a methylene main chain, ethylene-propylene copolymer with a methylene main chain, ethylene-vinyl acetate copolymer containing at least 26% of vinyl acetate, ethylene-butylacrylate copolymer, ethylene-methyl acrylate copolymer, and mixtures thereof.

5. A joint according to any one of the preceding claims, characterized in that said second layer is selected from the thermoplastic polyphase elastomers.

6. A joint according to claim 5, characterized in that said second layer is selected from mixtures of ethylene-propylene-diene terpolymer with a methylene main chain with poly(ethylene terephthalate), polyamide, polycarbonate and polypropylene.

7. A joint according to claim 5, characterized in that said second layer is selected from mixtures of very low density linear polyethylene with poly(ethylene terephthalate), polyamide, polycarbonate and polypropylene.

8. A joint according to claim 1, characterized in that said second layer is constituted by a cross-linked elastomer selected from ethylene-propylene-diene terpolymer with a methylene main chain, ethylene-propylene copolymer with a methylene main chain, and very low density linear polyethylene, and alloys and mixtures thereof.

* * * * *